(12) United States Patent
Sun

(10) Patent No.: US 9,388,844 B2
(45) Date of Patent: Jul. 12, 2016

(54) ANTI-ROTATION DEVICE FOR PIVOT AND HINGE DEVICE HAVING ANTI-ROTATION DEVICE

(75) Inventor: Yumin Sun, Beijing (CN)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 14/368,394

(22) PCT Filed: Dec. 28, 2011

(86) PCT No.: PCT/CN2011/084806
§ 371 (c)(1),
(2), (4) Date: Jun. 24, 2014

(87) PCT Pub. No.: WO2013/097109
PCT Pub. Date: Jul. 4, 2013

(65) Prior Publication Data
US 2015/0030410 A1    Jan. 29, 2015

(51) Int. Cl.
| F16B 39/10 | (2006.01) |
| F16C 11/02 | (2006.01) |
| F16C 11/04 | (2006.01) |
| F16B 21/20 | (2006.01) |
| F16B 39/02 | (2006.01) |

(52) U.S. Cl.
CPC .............. *F16B 39/10* (2013.01); *F16B 21/20* (2013.01); *F16C 11/02* (2013.01); *F16C 11/045* (2013.01); *F16B 39/02* (2013.01); *F16C 2326/43* (2013.01)

(58) Field of Classification Search
CPC ...... F16B 5/0657; F16B 21/075; F16B 21/12; F16B 39/08; F16B 39/10; E05D 11/0018; E05D 2011/0063

USPC .......... 411/117, 119, 120, 123, 141, 513, 522; 16/343

See application file for complete search history.

(56) References Cited

U.S. PATENT DOCUMENTS

| 470,708 A | 3/1892 | Schauweker |
| 594,950 A | 12/1897 | Honecker |

(Continued)

FOREIGN PATENT DOCUMENTS

| AT | 509228 A4 | 7/2011 |
| CH | 120588 A | 7/1927 |

(Continued)

OTHER PUBLICATIONS

International Search Report mailed Oct. 18, 2012, in International Application No. PCT/CN2011/084806, filed Dec. 28, 2011.

(Continued)

*Primary Examiner* — Roberta Delisle
(74) *Attorney, Agent, or Firm* — Hauptman Ham, LLP

(57) ABSTRACT

The present invention relates to an anti-rotation device for a pivot for rotatably connecting at least two fittings, the pivot having a polygonal pivot head, comprising: an inner anti-rotation part for preventing the rotating of a pivot head, which comprises at least one leg, which abuts against respective one of the side faces of the pivot head in the mounting state; an outer anti-rotation part for preventing the rotating of the inner anti-rotation part, which comprises at least one wall, each of which abuts against the respective one of the at least one leg in the mounting state; and a fixer for fixing the inner anti-rotation part to the outer anti-rotation part.

14 Claims, 5 Drawing Sheets

(56) References Cited

U.S. PATENT DOCUMENTS

| | | | |
|---|---|---|---|
| 665,272 A | 1/1901 | Schendel | |
| 712,904 A * | 11/1902 | Byers | 411/120 |
| 806,404 A * | 12/1905 | Elfborg | 411/197 |
| 887,382 A * | 5/1908 | Diplock | 411/120 |
| 1,166,220 A | 12/1915 | Jeannot | |
| 2,089,578 A * | 8/1937 | Schaefer | 411/61 |
| 2,154,655 A | 4/1939 | Bahan | |
| 3,594,851 A | 7/1971 | Swatton | |
| 4,476,673 A * | 10/1984 | Brown | 59/86 |
| 5,092,723 A * | 3/1992 | Compton et al. | 411/166 |
| 5,704,655 A * | 1/1998 | Lemburg | 285/80 |
| 6,595,732 B2 * | 7/2003 | Werner et al. | 411/104 |
| 2006/0188357 A1* | 8/2006 | Rowe et al. | 411/119 |
| 2009/0008953 A1* | 1/2009 | Bisso, IV | 294/82.17 |
| 2009/0116930 A1 | 5/2009 | Reimler | |
| 2010/0054894 A1* | 3/2010 | Caballero Asensio et al. | 411/524 |

FOREIGN PATENT DOCUMENTS

| | | |
|---|---|---|
| CN | 201884423 U | 6/2011 |
| CN | 102159838 A | 8/2011 |
| DE | 10060963 A1 | 6/2002 |
| FR | 2949249 A1 | 2/2011 |
| FR | 2956884 A1 | 9/2011 |
| JP | 2011132997 A | 7/2011 |

OTHER PUBLICATIONS

International Written Opinion mailed Oct. 18, 2012, in International Application No. PCT/CN2011/084806, filed Dec. 28, 2011.

Supplementary European Search Report dated Jul. 24, 2015 for EP Application No. 11878383.

\* cited by examiner

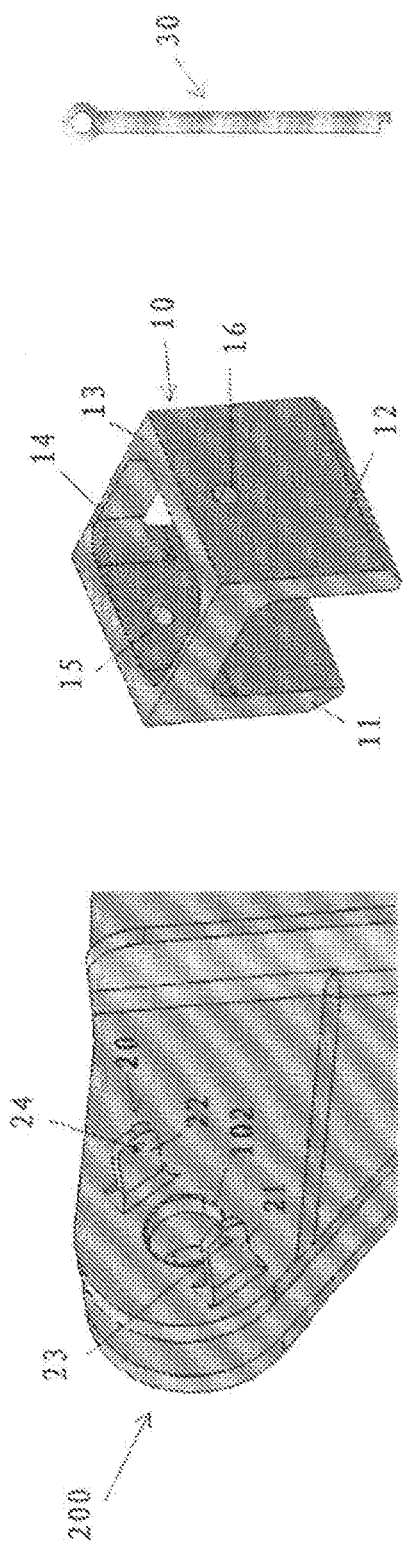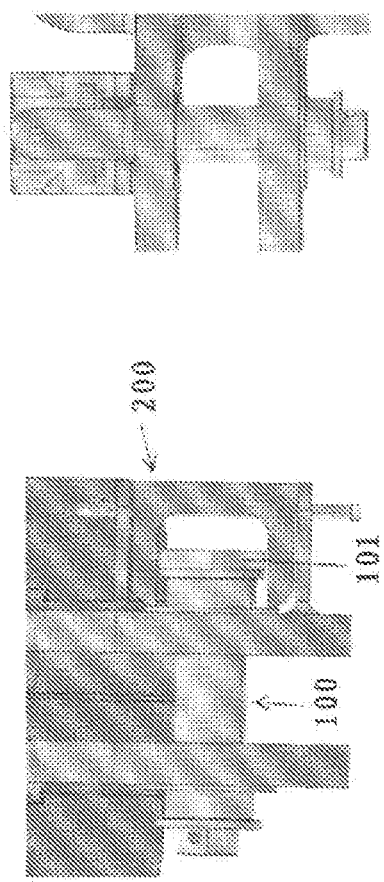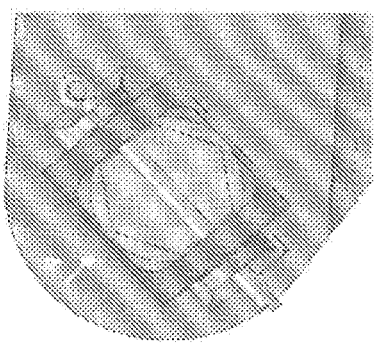

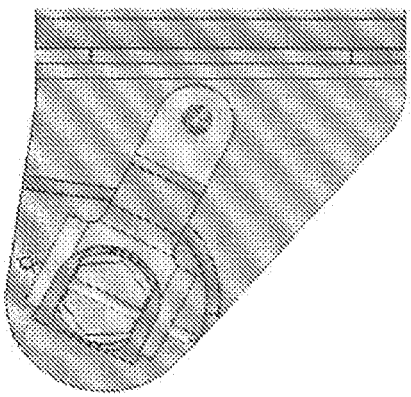
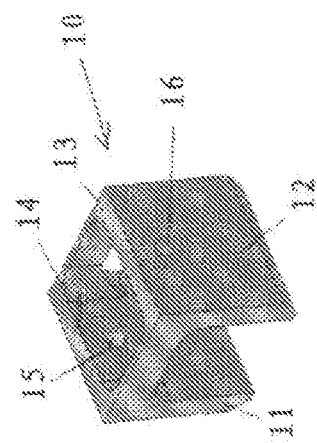
Fig. 4
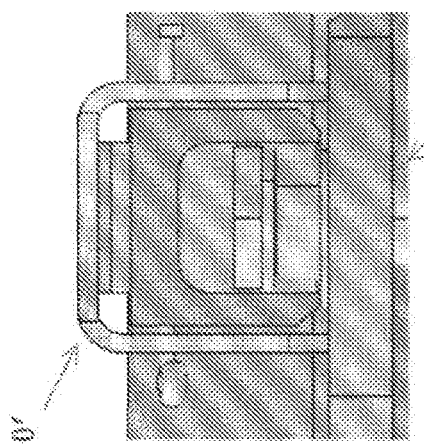
Fig. 5B
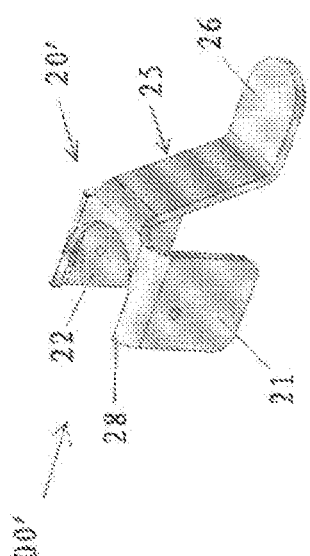
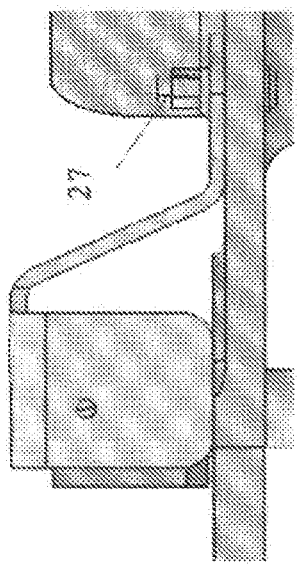
Fig. 5A
Fig. 5C

ANTI-ROTATION DEVICE FOR PIVOT AND HINGE DEVICE HAVING ANTI-ROTATION DEVICE

RELATED APPLICATIONS

The present application is a National Phase of International Application Number PCT/CN2011/084806, filed Dec. 28, 2011.

FIELD OF THE INVENTION

The present invention relates to an anti-rotation device for a pivot and a hinge device having the anti-rotation device.

BACKGROUND OF THE INVENTION

When two components are rotatably connected with each other, a hinge device is generally employed, which in general comprises a first fitting, a second fitting and a pivot, wherein the first fitting and the second fitting can be rotatably connected about a pivot. In order to prevent the pivot from rotating with the fittings, it is necessary to dispose an anti-rotation device, so as to prevent the pivot from abrasion and slipping off due to the rotating of the fittings.

For an aircraft, a bearing is conventionally applied at a hinge device, for example for movable components such as rudder and elevators, between the pivot and the fitting. To ensure stability of the slip path between the bearing and the pivot, it is typically required to dispose anti-rotation devices for the pivots. Moreover, the pivots used in the aircraft generally are not standardized parts, but specially manufactured for specific applications. Thus, it is necessary to have the pivot protected from abrasion and hence reduce its replacement frequency, which is time-consuming and may incur high expense.

In FIG. 1A, a traditional anti-rotation device for a pivot which is used in the rudder of the aircraft is shown. The anti-rotation device comprises an arm which on one end is fixed on the fitting through a fastener, and on the other end encloses the pivot head. However, stress verification is required for the fitting on which the anti-rotation device is fixed due to non-intactness of the fitting, and the location of the fastener needs to be optimized.

In FIG. 1B, an alternative approach for the above solution is shown. The anti-rotation device comprises a receiving body and an integral pin, wherein the receiving body is served for receiving the pivot head and preventing the rotating of the hexagonal pivot head, and the integral pin is inserted to a hole on the fitting so as to secure the whole anti-rotation device. However, when the anti-rotation device is damaged and needs to be replaced, it is necessary to firstly remove the pivots, and then the replacement of integral pin can be performed. Moreover, it also requires stress verification on the fitting.

SUMMARY OF THE INVENTION

The present invention is based on the object of providing an anti-rotation device for a pivot, which can be quickly replaced and easily repaired without disassembling the pivot when the anti-rotation device is replaced.

In order to achieve the object of the invention, an anti-rotation device for a pivot for rotatably connecting at least two fittings is provided, the pivot having a polygonal pivot head, which comprises: an inner anti-rotation part for preventing the rotating of a pivot head, which comprises at least one leg, which abuts against respective one of the side faces of the pivot head in the mounting state; an outer anti-rotation part for preventing the rotating of the inner anti-rotation part, which comprises at least one wall, each of which abuts against the respective one of the at least one leg of the inner anti-rotation part in the mounting state; and a fixer for fixing the inner anti-rotation part to the outer anti-rotation part. The abutment of the legs of the inner anti rotation part and the walls of the outer rotation part holds them in a fixed position. When a tool (such as a torque wrench) is needed to tighten or disassemble the pivot during the service of the aircraft, through simply removing the fixer and the inner anti-rotation part of the anti-rotation device according to the disclosure, the tool can be easily operated by the user, so that the outer anti-rotation part cannot be damaged.

Preferably; the inner anti-rotation part comprises two legs and one connecting part, so as to form an approximate U-shape section, and the spacing between the two legs is adapted to receive the pivot head. In this way, the pivot can be better prevented from rotating. A small distance between the inner anti-rotation part and the pivot head may need to be kept considering manufacturing and assemble tolerances.

Preferably, the outer anti-rotation part comprises two opposing walls, and the spacing between the two walls is adapted to receive the inner anti-rotation part. In this way, the inner anti-rotation part can be better prevented from rotating. A small distance between the outer anti-rotation part and the walls also may need to be kept considering manufacturing and assemble tolerances.

Preferably, an opening is disposed in the connecting part of the inner anti-rotation part. Therefore, in the process that the user mounts the inner anti-rotation part on the pivot head, he or she can observe the pivot through the opening, so as to facilitate the mounting of the anti-rotation device.

Preferably, the inner anti-rotation part can be made of Nylon material. Since the Nylon material is light and relative economical, it is suitable for the aircraft and the manufacture cost can be saved. Other materials, such as aluminum alloy, are also possible.

Preferably, the outer anti-rotation part is integrated with one of the fittings.

Preferably, the fixing part is a cotter pin. Further preferably, holes for inserting the cotter pin are respectively disposed in the two legs of the inner anti-rotation part and in the two walls of the outer anti-rotation part. in this way, a simple fixing can be achieved.

As alternatives, the outer anti-rotation part is detachably fixed on one of the fittings. Further preferably, the outer anti-rotation part further comprises a joggle and a tail, wherein the joggle connects the two walls and the tail, and the tail is used for detachably fixing on one of the fittings. In this way, the anti-rotation device according to the disclosure can be mounted on any position where the function of anti-rotation is needed.

Preferably, the tail is fixed on the position away from the pivot head. Further preferably, the joggle comprises a top part connecting the two walk on the upper end, on which a cutout is formed, and the size of the cutout is adapted to make a tool for the pivot pass therethrough. Therefore, the tool can get access to the pivot. In addition, the walls, joggle and tail of the outer anti-rotation part can be integratedly manufactured, i.e. the outer anti-rotation part is one piece.

In addition, the disclosure also relates to a hinge device, which comprises at least two fittings, which are rotatably connected through a pivot, the hinge device further comprising the anti-rotation device according to the disclosure.

BRIEF DESCRIPTION OF THE DRAWINGS

Embodiments of the invention will be explained in detail below with reference to the drawings, in which:

FIG. 2 shows an exploded view of an anti-rotation device according to the first embodiment of the disclosure;

FIGS. 3A, 3B, 3C show a top view and side views of the anti-rotation device according to the first embodiment of the disclosure applied on an aircraft;

FIG. 4 shows a an exploded view of an anti-rotation device according to the second embodiment of the disclosure;

FIGS. 5A, 5B, 5C show a top view and side views of the anti-rotation device according to the second embodiment of the disclosure applied on an aircraft;

DETAILED DESCRIPTION OF THE DRAWINGS

Figure 1A:
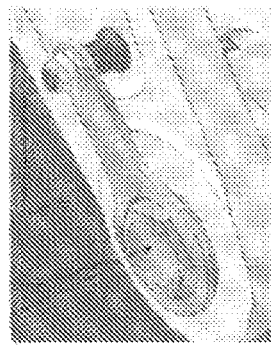
FIGS. 1A, 1B show perspective views of anti-rotation devices of the prior art.
Figure 1B:
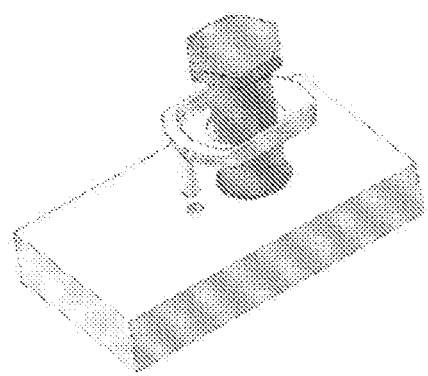

FIGS. 2 and 3A, 3B, 3C show an anti-rotation device 200 for a pivot 100 on an aircraft according to the first embodiment of the disclosure, which comprises: an inner anti-rotation part 10 for preventing the rotating of a pivot head 101, which comprises at least one leg (in this embodiment, two legs 11, 12), which abuts against one of the side face of the pivot head 101 in the mounting state (in this embodiment, abuts against two side faces of the hexagonal pivot head 101); an outer anti-rotation part 20 for preventing the rotating of the inner and-rotation part 10, which comprises at least one wall (in this embodiment, two walls 21, 22), each of which abuts against the respective one of the at least one leg of the inner anti-rotation part 10 in the mounting state and holds fixing; and a fixer 30 for fixing the inner anti-rotation part 10 to the outer anti-rotation part 20.

In this embodiment, the inner anti-rotation part 10 comprises two legs 11, 12 and one connecting part 13, so as to form an approximate U-shape section, and the spacing between the two legs 11, 12 is adapted to receive the pivot head 101. An opening 14 is disposed in the connecting part 13 of the inner anti-rotation part 10, thus in the process that the user mounts the inner anti-rotation part 10 on the pivot head, he or she can observe the pivot through the opening, so as to facilitate the mounting of the anti-rotation device. The inner anti-rotation part 10 can be made of Nylon material. Since the Nylon material is light and relative economical, it is suitable for the aircraft and the manufacture cost can be saved. Other materials, such as aluminum alloy, are also possible. in the legs 11, 12 of the inner anti-rotation part 10 holes 15, 16 for inserting the fixer 30 are respectively disposed.

In this embodiment, the outer anti-rotation part 20 is integrally formed with the component in which the pivot 100 is mounted. The outer anti-rotation part 20 comprises two opposite walls 21, 22, and the spacing between the two walls 21, 22 is adapted to receive the inner anti-rotation part 10. In the walls 21, 22 of the outer anti-rotation part 20 holes 23, 24 for inserting the fixer 30 are respectively disposed.

In this embodiment, the fixing part 30 is in the form of a pin such as a cotter pin), but other means that can fix the outer anti-rotation part to the inner anti-rotation part are possible. By inserting the fixer 30 respectively in the holes 15, 16 of the two legs 11, 12 of the inner anti-rotation part 10 and the holes 23, 24 of the two walls 21, 22 of the outer anti-rotation part 20, the inner anti-rotation part 10 can fixed on the outer anti-rotation part 20.

When the anti-rotation device 200 according to the first embodiment of the disclosure is mounted on the pivot 100, especially as shown in FIG. 3B, a gap can be exist between the legs 11, 12 of the inner anti-rotation part 10 and the pivot 101, and a gap can be also exist between the legs 11, 12 of the inner anti-rotation part 10 and the walls 21, 22 of the outer anti-rotation part 20.

FIGS. 4 and 5A, 5B, 5C show an anti-rotation device 200' for a pivot 100 on an aircraft according to the second embodiment of the disclosure. The anti-rotation device 200' according to this embodiment differs from the anti-rotation device 200 according to the first embodiment in the outer anti-rotation part 20', thus the description of the same parts will be not repeated.

In the anti-rotation device 200' according to this embodiment, the outer anti-rotation part 20' further comprises a joggle 25 and a tail 26, wherein the joggle connects the two walls 21, 22 and the tail 26, and the tall is used for fixing on the component in which the pivot 100 is mounted. The tail 26 can be detachable fixed on the component in which the pivot is mounted, for example by a screw 27, and preferably fixed on the position away from the pivot head 101. The joggle 25 comprises a top part connecting the two walls 21, 22 on the upper end, on which a cutout 28 is formed, and the size of the cutout 28 is adapted to make a tool (such as a torque wrench) for the pivot pass therethrough. In addition, the walls 21, 22, joggle 25 and tail 26 of the outer anti-rotation part can be integratedly manufactured, i.e. the outer anti-rotation part is one piece.

Furthermore, the anti-rotation device according to the above two embodiments can be used in a way, that the anti-rotation device according to the first embodiment is used when firstly applied on the aircraft, while the anti-rotation device according to the second embodiment is used when the wall of the anti-rotation device according to the first embodiment is damaged and thus needs to be replaced. Since the anti-rotation device according to the first embodiment is integratedly formed on the fitting, it is required to replace the whole fitting if such anti-rotation device is still used when replacing, thus the cost and replacement period would be increased. Therefore, in order to quickly repair, the anti-rotation device according to the first embodiment can be replaced with the anti-rotation device according to the second embodiment.

The mounting process of the anti-rotation device according to the disclosure is described as follows by referring to FIGS. 6A, 6B and 7.

Figure 6B:
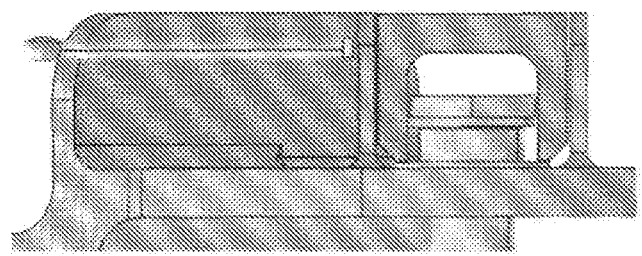
FIGS. 6A, 6B show the mounting process of the anti-rotation device according to the first embodiment of the disclosure.
Figure 6A:
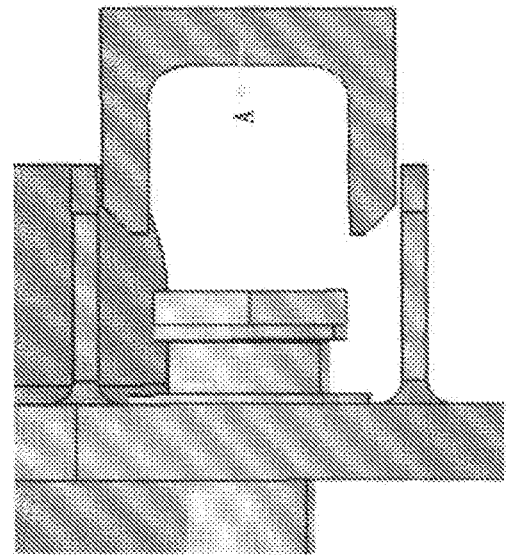

In FIGS. 6A, 6B the mounting process of the anti-rotation device according to the first embodiment of the disclosure is shown. After the pivot is tightened by a tool (such as a torque wrench), the inner anti-rotation part is inserted in place from above of the pivot, as shown by arrow A in FIG. 6A. Alternatively, the inner anti-rotation part can be also pushed in place laterally in the direction parallel to the walls of the outer anti-rotation part. Then, the cotter pin is inserted in the holes of the walls of the outer anti-rotation part and of the legs of the inner anti-rotation part, so that the inner anti-rotation part is fixed on the outer anti-rotation part.

Figure 7:
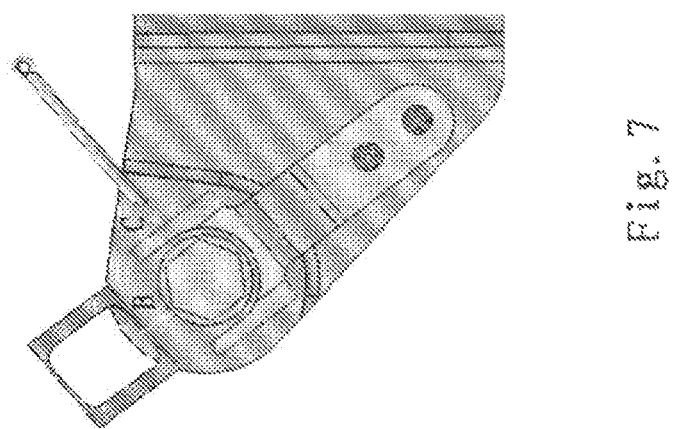
FIG. 7 shows the mounting process of the anti-rotation device according to the second embodiment of the disclosure.

In FIG. 7 the mounting process of the anti-rotation device according to the second embodiment of the disclosure is shown. After the pivot is tightened by a tool (such as a torque wrench), the outer anti-rotation part is fixed in place near the pivot by means of a screw part. Then, the inner anti-rotation part is pushed in place laterally in the direction parallel to the walls of the outer anti-rotation part. Then, the cotter pin is inserted in the holes of the walls of the outer anti-rotation part and of the legs of the inner anti-rotation part, so that the inner anti-rotation part is fixed on the outer anti-rotation part.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein. incorporated as if individually set forth.

LIST OF REFERENCE NUMERALS 10 inner anti-rotation part
11 leg
12 leg
13 connecting part
14 opening
15 hole
16 hole
20, 20' outer anti-rotation part
21 wall
22 wall
23 hole
24 hole
25 joggle
26 tail
27 screw
28 cutout
30 fixer
100 pivot
101 pivot head
102 pivot hole
200, 200' anti-rotation device

The invention claimed is:

1. An anti-rotation device for a pivot for rotatably connecting at least two fittings, the pivot having a polygonal pivot head, comprising:
   an inner anti-rotation part for preventing the rotating of a pivot head, which comprises at least one leg, which abuts against respective one of the side faces of the pivot head in the mounting state;
   an outer anti-rotation part for preventing the rotating of the inner anti-rotation part, which comprises at least one wall, each of which abuts against the respective one of the at least one leg of the inner anti-rotation part in the mounting state; and
   a fixer for fixing the inner anti-rotation part to the outer anti-rotation part.

2. An anti-rotation device according to claim 1, wherein the inner anti-rotation part comprises two legs and one connecting part, so as to form an approximate U-shape section, and the spacing between the two legs is adapted to receive the pivot head.

3. An anti-rotation device according to claim 2, wherein an opening is disposed in the connecting part of the inner anti-rotation part.

4. An anti-rotation device according to claim 1, wherein the outer anti-rotation part comprises two opposing walls, and the spacing between the two walls is adapted to receive the inner anti-rotation part.

5. An anti-rotation device according to claim 4, wherein the outer anti-rotation part is detachably fixed on one of the fittings.

6. An anti-rotation device according to claim 5, wherein the outer anti-rotation part further comprises a joggle and a tail, wherein the joggle connects the two walls and the tail, and the tail is used for detachably fixing on one of the fittings.

7. An anti-rotation device according to claim 6, wherein the tail is fixed on the position away from the pivot head.

8. An anti-rotation device according to claim 6, wherein the outer anti-rotation part is one piece.

9. An anti-rotation device according to claim 1, wherein the inner anti-rotation part is made of Nylon material.

10. An anti-rotation device according to claim 1, wherein the outer anti-rotation part is integrally formed with one of the fittings.

11. An anti-rotation device according to claim 1, wherein the fixer is a cotter pin.

12. An anti-rotation device according to claim 11, wherein holes for inserting the cotter pin are respectively disposed in the two legs of the inner anti-rotation part and in the two walls of the outer anti-rotation part.

13. A hinge device, comprising at least two fittings, which are rotatably connected through a pivot, wherein the hinge device further comprises the anti-rotation device according to claim 1.

14. An anti-rotation device for a pivot for rotatably connecting at least two fittings, the pivot having a polygonal pivot head, comprising:
   an inner anti-rotation part for preventing the rotating of a pivot head, which comprises at least one leg, which abuts against respective one of the side faces of the pivot head in the mounting state;
   an outer anti-rotation part for preventing the rotating of the inner anti-rotation part, which comprises at least one wall, each of which abuts against the respective one of the at least one leg of the inner anti-rotation part in the mounting state;
   a fixer for fixing the inner anti-rotation part to the outer anti-rotation part;
   wherein the outer anti-rotation part comprises two opposing walls, and the spacing between the two walls is adapted to receive the inner anti-rotation part;
   wherein the outer anti-rotation part is detachably fixed on one of the fittings;
   wherein the tail is fixed on the position away from the pivot head,
   wherein the joggle comprises a top part connecting the two walls on the upper end, on which a cutout is formed, and the size of the cutout is adapted to make a tool for the pivot pass therethrough.

* * * * *